(12) United States Patent
Hirayama et al.

(10) Patent No.: US 8,568,893 B2
(45) Date of Patent: *Oct. 29, 2013

(54) BIREFRINGENT FILM AND POLARIZER

(75) Inventors: Tomoyuki Hirayama, Ibaraki (JP);
Toshiyuki Iida, Ibaraki (JP); Yutaka Ohmori, Ibaraki (JP); Satoru Suzuki, Ibaraki (JP); Miyuki Kurogi, Ibaraki (JP); Hisae Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 327 days.

This patent is subject to a terminal disclaimer.

(21) Appl. No.: 12/918,642

(22) PCT Filed: Jan. 27, 2009

(86) PCT No.: PCT/JP2009/051272
§ 371 (c)(1),
(2), (4) Date: Aug. 20, 2010

(87) PCT Pub. No.: WO2009/104457
PCT Pub. Date: Aug. 27, 2009

(65) Prior Publication Data
US 2010/0328772 A1 Dec. 30, 2010

(30) Foreign Application Priority Data

Feb. 20, 2008 (JP) ................................ 2008-039073

(51) Int. Cl.
| | |
|---|---|
| *B32B 27/06* | (2006.01) |
| *B32B 27/08* | (2006.01) |
| *B32B 27/36* | (2006.01) |
| *B32B 7/12* | (2006.01) |
| *C08G 63/02* | (2006.01) |
| *C08G 63/12* | (2006.01) |
| *C08G 63/127* | (2006.01) |
| *C08G 63/13* | (2006.01) |
| *C08G 63/16* | (2006.01) |
| *C08G 63/18* | (2006.01) |
| *C08G 63/185* | (2006.01) |
| *C08G 63/19* | (2006.01) |
| *C08G 63/193* | (2006.01) |

(52) U.S. Cl.
USPC .......... 428/480; 428/1.31; 428/1.33; 428/1.6; 359/483.01; 359/489.01; 359/489.07; 349/96

(58) Field of Classification Search
None
See application file for complete search history.

(56) References Cited

U.S. PATENT DOCUMENTS

| | | | |
|---|---|---|---|
| 4,123,454 A * | 10/1978 | Buxbaum | ..................... 528/173 |
| 4,617,370 A | 10/1986 | Lenz et al. | |
| 4,654,412 A * | 3/1987 | Calundann et al. | ........... 528/176 |
| 4,789,755 A | 12/1988 | Van Sickle et al. | |
| 4,801,677 A * | 1/1989 | Eckhardt et al. | ............... 528/176 |
| 4,985,532 A | 1/1991 | Pakull et al. | |
| 5,344,916 A | 9/1994 | Harris et al. | |
| 5,480,964 A | 1/1996 | Harris et al. | |
| 5,580,950 A | 12/1996 | Harris et al. | |
| 5,614,599 A | 3/1997 | Bales et al. | |
| 5,804,634 A | 9/1998 | Umetsu et al. | |
| 5,989,758 A * | 11/1999 | Komatsu et al. | ................. 430/20 |
| 6,046,300 A | 4/2000 | Umetsu et al. | |
| 6,075,114 A | 6/2000 | Umetsu et al. | |
| 6,610,219 B2 * | 8/2003 | McGinniss et al. | ........... 252/582 |

(Continued)

FOREIGN PATENT DOCUMENTS

| | | |
|---|---|---|
| EP | 1387210 A1 | 2/2004 |
| JP | 62-121722 A | 6/1987 |

(Continued)

OTHER PUBLICATIONS

International Search Report of PCT/JP2009/051272, mailing date of Apr. 28, 2009.

(Continued)

*Primary Examiner* — Vivian Chen
(74) *Attorney, Agent, or Firm* — Westerman, Hattori, Daniels & Adrian, LLP

(57) ABSTRACT

An ester-based polymer to be used in the present invention has at least a repeating unit represented with the general formula (I). A and B are substituents substituted on a stilbene group. $R_1$ is a hydrogen atom, a linear or branched alkyl group having 1 to 10 carbon atoms, or a substituted or unsubstituted aryl group. $R_2$ is a linear or branched alkyl group having 2 to 10 carbon atoms. $R_3$ to $R_6$ each independently represents a hydrogen atom, a halogen atom, a linear or branched alkyl group having 1 to 6 carbon atoms, or a substituted or unsubstituted aryl group. n is an integer of 2 or more.

[Chemical formula 1]

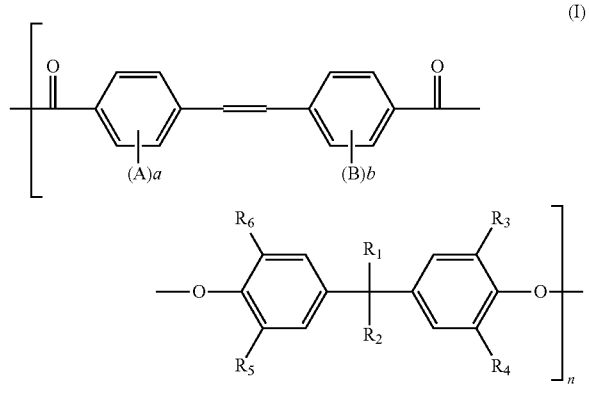

11 Claims, No Drawings

(56) References Cited

U.S. PATENT DOCUMENTS

| | | | |
|---|---|---|---|
| 6,795,246 B2 * | 9/2004 | Yano et al. | 359/489.07 |
| 6,853,424 B2 | 2/2005 | Elman et al. | |
| 7,012,663 B2 | 3/2006 | Ono et al. | |
| 7,052,747 B2 * | 5/2006 | Nishikouji et al. | 428/1.3 |
| 7,087,682 B2 | 8/2006 | Tadros et al. | |
| 7,270,858 B2 * | 9/2007 | Yamaoka et al. | 428/1.3 |
| 7,462,381 B2 * | 12/2008 | Yoshimi et al. | 428/1.1 |
| 7,494,689 B2 * | 2/2009 | Hayashi et al. | 427/162 |
| 7,625,612 B2 | 12/2009 | Ohmori et al. | |
| 2004/0021815 A1 | 2/2004 | Elman | |
| 2004/0027521 A1 | 2/2004 | Elman et al. | |
| 2004/0223103 A1 | 11/2004 | Elman | |
| 2005/0096431 A1 | 5/2005 | Fujii et al. | |
| 2006/0082708 A1 * | 4/2006 | Nagase et al. | 349/124 |
| 2006/0177607 A1 | 8/2006 | Ohmori et al. | |
| 2006/0229428 A1 | 10/2006 | Shaikh et al. | |
| 2007/0273816 A1 | 11/2007 | Kitagawa et al. | |
| 2009/0046228 A1 | 2/2009 | Takeda et al. | |
| 2009/0116109 A1 | 5/2009 | Konishi et al. | |
| 2010/0020279 A1 | 1/2010 | Nagase et al. | |
| 2010/0159158 A1 | 6/2010 | Shibata et al. | |
| 2010/0188749 A1 | 7/2010 | Hirayama et al. | |
| 2010/0265579 A1 * | 10/2010 | Iida et al. | 359/485 |
| 2010/0304110 A1 | 12/2010 | Iida et al. | |
| 2010/0328772 A1 | 12/2010 | Hirayama et al. | |
| 2011/0013278 A1 * | 1/2011 | Hirayama et al. | 359/494 |
| 2011/0176092 A1 * | 7/2011 | Iida et al. | 349/96 |
| 2012/0081785 A1 | 4/2012 | Iida et al. | |

FOREIGN PATENT DOCUMENTS

| | | |
|---|---|---|
| JP | 1-240517 A | 9/1989 |
| JP | 3-014882 A | 1/1991 |
| JP | 3-500412 A | 1/1991 |
| JP | 3-122137 A | 5/1991 |
| JP | 7-233249 A | 9/1995 |
| JP | 8-134336 A | 5/1996 |
| JP | 11-271529 * | 10/1999 |
| JP | 11-271529 A | 10/1999 |
| JP | 2001-343529 A | 12/2001 |
| JP | 2002-311240 A | 10/2002 |
| JP | 3417949 B2 | 6/2003 |
| JP | 2003-315538 A | 11/2003 |
| JP | 2004-70329 A | 3/2004 |
| JP | 3984277 B2 | 10/2007 |
| JP | 2008-3559 A | 1/2008 |
| JP | 2008-003559 A | 1/2008 |
| JP | 2008-33285 A | 2/2008 |
| JP | 2008-170514 A | 7/2008 |
| JP | 2008-535977 A | 9/2008 |
| KR | 2010-0093084 A | 8/2010 |
| WO | 89/03380 A1 | 4/1989 |
| WO | 94/24191 A1 | 10/1994 |
| WO | 97/22649 A1 | 6/1997 |
| WO | 01-37007 A1 | 5/2001 |
| WO | 2007/132816 A1 | 11/2007 |

OTHER PUBLICATIONS

Japanese Office Action dated Dec. 21, 2012, issued in Japanese patent application No. 2009-100128 corresponding to U.S. Appl. No. 12/721,901, which is a co-pending application w/ the current application, w/ English translation.

Japanese Translation of Taiwanese Office Action dated Oct. 18, 2012, issued in corresponding Taiwanese Patent Application No. 098103567, (3 pages).

Korean Office Action dated Jan. 9, 2012, issued in corresponding Korean Patent Application No. 2010-0026645.

* cited by examiner

BIREFRINGENT FILM AND POLARIZER

FIELD OF THE INVENTION

The present invention relates to an optical film, and more particularly to a birefringent film and a polarizing element.

BACKGROUND OF THE INVENTION

In a liquid crystal panel, a birefringent film is used so as to control a phase difference of light. There is known, as the birefringent film, those obtained by flow-casting of a coating solution containing an aromatic polymer such as an aromatic polyimide or an aromatic polyester as a main component on a base material such as a glass plate or a polymer film to form a coating film, and orienting the aromatic polymer (Japanese Unexamined Patent Publication No. 2004-70329 A).

A conventional kind of an aromatic polymer has a feature that it is excellent in heat resistance and mechanical strength. On the other hand, the aromatic polymer has a disadvantage that it is inferior in solubility in an organic solvent. Therefore, a birefringent film containing a conventional aromatic polymer as a main component has been formed by dissolving the aromatic polymer in a solvent having high polarity such as cyclopentanone, methyl ethyl ketone or dichloroethane to obtain a solution, followed by flow casting and coating of the solution and further drying. However, since the option of a solution capable of dissolving the aromatic polymer is limited in this film-forming method, drying conditions were limited and expensive facilities were required. Therefore, an aromatic polymer soluble in a solvent having low polarity such as toluene has been required.

SUMMARY OF THE INVENTION

An object of the present invention is to realize a birefringent film which contains an aromatic polymer having high solubility in a solvent having low polarity, and also has a large birefringence index $\Delta n_{xz}$ (=$n_x$−$n_z$) in the thickness direction.

The present inventors have intensively studied so as to improve a relationship between high solubility and large birefringence index $\Delta n_{xz}$ in the thickness direction, which was a mutually conflicting relationship, and have found that the above object can be achieved by:
(1) introduction of a stilbene group into a polymer backbone, and
(2) introduction of a specific substituent into $R_2$ in the general formula (I) or $R_2$ and $R_8$ in the general formula (II).

The gist of the present invention is as follows:

In a first preferred embodiment, a birefringent film according to the present invention includes an ester-based polymer having at least a repeating unit represented by the following general formula (I):

[Chemical formula 1]

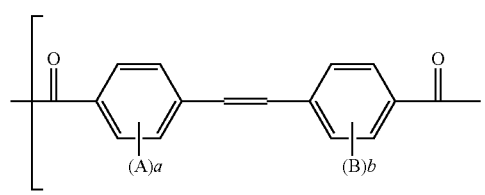

(I)

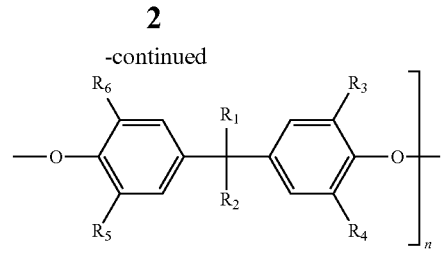

wherein A and B each independently represents a hydrogen atom, a halogen atom, an alkyl group having 1 to 6 carbon atoms, or a substituted or unsubstituted aryl group; a and b each independently represents any one of integers of 0 to 4; $R_1$ represents a hydrogen atom, a linear or branched alkyl group having 1 to 10 carbon atoms, or a substituted or unsubstituted aryl group; $R_2$ represents a linear or branched alkyl group having 2 to 10 carbon atoms; $R_3$ to $R_6$ each independently represents a hydrogen atom, a halogen atom, a linear or branched alkyl group having 1 to 6 carbon atoms, or a substituted or unsubstituted aryl group; and n represents an integer of 2 or more.

In a second preferred embodiment of the birefringent film according to the present invention, $R_1$ is a methyl group, and $R_2$ is a linear or branched alkyl group having 2 to 4 carbon atoms in the above general formula (I).

In a third preferred embodiment of the birefringent film according to the present invention, $R_3$ to $R_6$ each independently represents a linear or branched alkyl group having 1 to 4 carbon atoms in the above general formula (I).

In a fourth preferred embodiment, the birefringent film according to the present invention includes a copolymer ester-based polymer having at least a repeating unit represented by the following general formula (II):

[Chemical Formula 2]

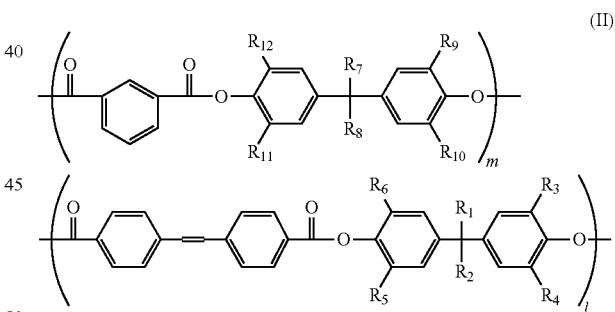

(II)

wherein $R_1$ represents a hydrogen atom, a linear or branched alkyl group having 1 to 10 carbon atoms, or a substituted or unsubstituted aryl group; $R_2$ represents a linear or branched alkyl group having 2 to 10 carbon atoms; $R_3$ to $R_6$ each independently represents a hydrogen atom, a halogen atom, a linear or branched alkyl group having 1 to 6 carbon atoms, or a substituted or unsubstituted aryl group; $R_3$ and $R_8$ are respectively the same as those for $R_1$ and $R_2$; $R_9$ to $R_{12}$ are respectively the same as those for $R_3$ to $R_6$; and l and m are integers of 2 or more.

In a fifth preferred embodiment of the birefringent film according to the present invention, the value of l/(l+m) is from 0.3 to 0.8 in the copolymer ester-based polymer represented by the general formula (II).

In a sixth preferred embodiment of the birefringent film of the present invention, the ester-based polymer having at least a repeating unit represented by the general formula (I) or (II) has a glass transition temperature of 100° C. or higher and 300° C. or lower.

In a seventh preferred embodiment, a polarizing element according to the present invention includes the birefringent film and a polarizer.

In an eighth preferred embodiment of the polarizing element according to the present invention, the birefringent film, an adhesive layer, a polarizer, an adhesive layer and a transparent protective film are laminated in this order.

In a ninth preferred embodiment of the polarizing element according to the present invention, a laminate of the birefringent film and a base material, an adhesive layer, a polarizer, and adhesive layer and a transparent protective film are laminated in this order.

ADVANTAGES OF THE INVENTION

Since the birefringent film of the present invention contains an ester-based polymer having at least a repeating unit represented by the general formula (I) or (II), which has high solubility even in a solvent having low polarity, it is possible to realize a birefringent film which shows high degree of freedom of a base material to be coated with the ester-based polymer, and also has a large birefringence index $\Delta n_{xz}$ ($=n_x-n_z$) in the thickness direction.

DESCRIPTION OF THE PREFERRED EMBODIMENTS

A conventional aromatic polymer had a problem that solubility deteriorates when a birefringence index $\Delta n_{xz}$ in the thickness direction is increased by linearizing a polymer structure, while the birefringence index $\Delta n_{xz}$ in the thickness direction decreases when solubility is enhanced by curving a polymer structure. The former includes, for example, a para-substituted 6-membered ring such as terephthalic acid and the latter includes, for example, a meta-substituted 6-membered ring such as isophthalic acid. That is, the enhancement of solubility and an increase of the birefringence index $\Delta n_{xz}$ in the thickness direction had a mutually conflicting relationship.

The present inventors have intensively studied so as to improve a relationship between the solubility and the birefringence index $\Delta n_{xz}$ in the thickness direction, which has hitherto been in a mutually conflicting relationship, and have found that the relationship between the solubility and the birefringence index in the thickness direction can be improved by:
(1) introduction of a stilbene group into a polymer backbone, and
(2) introduction of a specific substituent into $R_2$ in the general formula (I) or $R_2$ and $R_8$ in the general formula (II). The specific substituent to be introduced into $R_2$ and $R_8$ is a linear or branched alkyl group having 2 to 10 carbon atoms. The reason is estimated as follows:
(1) Since the stilbene group can enhance the solubility by moderately curving a polymer chain and is also rich in π-electrons, it is possible to increase the birefringence index $\Delta n_{xz}$ in the thickness direction by enhancing the interaction between aromatic rings.
(2) The specific substituent to be introduced into $R_2$ and $R_8$ can deform adjacent two benzene rings so as to twist with each other according to the size of the substituent, thus enhancing the solubility. Also, the specific substituent can inhibit a decrease of the birefringence index $\Delta n_{xz}$ in the thickness direction by maintaining linearity of the polymer structure.

[Birefringent Film]

The birefringent film of the present invention is characterized by containing an ester-based polymer having at least a repeating unit represented by the general formula (I) or (II). In the present specification, the term "birefringent film" means a transparent film having refractive index anisotropy in either or both of a film plane and the thickness direction. The birefringent film of the present invention preferably satisfies a relation ship that a refractive index $n_z$ in the thickness direction of the film is smaller than a maximum refractive index $n_x$ in the film plane, i.e. $n_x > n_z$.

The birefringence index $\Delta n_{xz}$ ($=n_x-n_z$) at a wavelength of 550 nm in the thickness direction in the birefringent film of the present invention is preferably 0.02 or more, and more preferably from 0.02 to 0.08. Since the birefringent film of the present invention has such a high birefringence index $\Delta n_{xz}$ in the thickness direction, it becomes possible to produce a birefringent film having a desired phase difference value in the thickness direction Rth ($=\Delta n_{xz} \times$ film thickness), the thickness of which is thinner.

The thickness of the birefringent film of the present invention is appropriately set according to use applications and a desired phase difference value in the thickness direction, but is preferably from 1 μm to 20 μm, and more preferably from 1 μm to 10 μm.

The transmittance at a wavelength of 400 nm in the birefringent film of the present invention is preferably 90% or more, and more preferably 92% or more. It was possible for the birefringent film of the present invention to obtain such high transmittance by using an ester-based polymer having at least a repeating unit represented by the general formula (I) or (II). This is because the specific substituent to be introduced into $R_2$ and $R_8$ deforms adjacent two benzene rings so as to twist with each other, thus making it possible to inhibit excess overlap of benzene rings.

[Ester-based Polymer]

The birefringent film of the present invention is characterized by containing an ester-based polymer having at least a repeating unit represented by the following general formula (I).

[Chemical Formula 1]

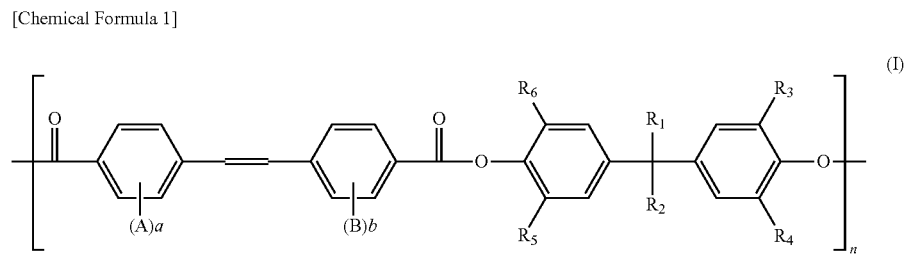

In the general formula (I), A and B are substituents substituted with a stilbene group and each independently represents a hydrogen atom, a halogen atom, an alkyl group having 1 to 6 carbon atoms, or a substituted or unsubstituted aryl group. a and b are the numbers of substitution of A and B and each independently represents any one of integers of 0 to 4. $R_1$ represents a hydrogen atom, a linear or branched alkyl group having 1 to 10 carbon atoms, or a substituted or unsubstituted aryl group. $R_2$ represents a linear or branched alkyl group having 2 to 10 carbon atoms. $R_3$ to $R_6$ each independently represents a hydrogen atom, a halogen atom, a linear or branched alkyl group having 1 to 6 carbon atoms, or a substituted or unsubstituted aryl group. n represents an integer of 2 or more.

In such a manner, it become possible to support enhancement of the solubility and an increase of the birefringence index $\Delta n_{xz}$ in the thickness direction at the same time by introducing a stilbene group into a polymer backbone and introducing a specific substituent into $R_2$ and $R_8$.

Preferably, $R_1$ in the general formula (I) is a methyl group and $R_2$ is a linear or branched alkyl group having 2 to 4 carbon atoms. $R_3$ to $R_6$ are linear or branched alkyl groups having 1 to 4 carbon atoms. When the alkyl group of $R_1$ to $R_6$ has too many carbon atoms (for example, 11 or more carbon atoms in $R_1$ and $R_2$, 7 or more carbon atoms in $R_3$ to $R_6$), the birefringence index in the thickness direction may decrease and heat resistance (glass transition temperature) may deteriorate.

In one embodiment, the birefringent film of the present invention contains an ester-based polymer (copolymer) having at least a repeating unit represented by the following general formula (II). In the formula (II), l and m are integers of 2 or more, $R_1$ to $R_6$ are the same as those in the general formula (I). $R_7$ and $R_8$ are respectively the same as those for $R_1$ and $R_2$, and $R_9$ to $R_{12}$ are respectively the same as those for $R_3$ to $R_6$. l and m represent an integer of 2 or more.

[Chemical Formula 2]

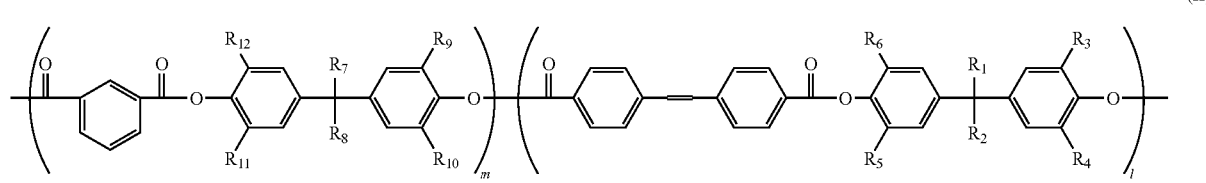

(II)

There is no particular limitation on sequence of the polymer represented by the general formula (II), and the polymer may be either a block copolymer or a random copolymer. In the ester-based polymer represented by the general formula (II), the content of a repeating unit having a stilbene group, i.e., the value of l/(l+m) is preferably 0.3 or more, and more preferably from 0.3 to 0.8. When the value of l/(l+m) is within the above range, it is possible to obtain a birefringent film which is particularly excellent in solubility and also has a large birefringence index in the thickness direction.

The weight average molecular weight (Mw) of the above ester-based polymer is not particularly limited, but is preferably from 10,000 to 500,000. The glass transition temperature of the ester-based polymer is preferably 100° C. or higher in view of heat resistance, and preferably 300° C. or lower in view of moldability and drawability.

The birefringent film of the present invention preferably contains the ester-based polymer in an amount within a range from 50% by weight to 100% by weight, and more preferably from 80% by weight to 100% by weight, based on the total weight of the birefringent film. The birefringent film of the present invention may contain a polymer (for example, an imide-based polymer, an etherketone-based polymer, an amideimide-based polymer, a styrene-based polymer, etc.) other than the ester-based polymer containing at least a repeating unit represented by the general formula (I) or (II). The birefringent film of the present invention can contain any additives such as ultraviolet absorbers, antistatic agents and antioxidants.

[Method for Polymerizing Ester-based Polymer]

The ester-based polymer can be usually obtained by polycondensing a biphenol compound with a dicarboxylic acid compound. Although there is no particular limitation on the polycondensation method, it is preferred to use an interfacial polymerization in which a biphenol compound is reacted with a dicarboxylic acid compound in the presence of a phase transfer catalyst, using a two-phase system of an aqueous alkali solution and a water-immiscible organic solvent. According to such a polymerization method, it is possible to obtain an ester-based polymer, which is excellent in transparency and also has a large molecular weight.

For example, it is possible to use, as the biphenol compound, 2,2-bis(3,5-dimethyl-4-hydroxyphenyl)-4-methylpentane, 2,2-bis(3-methyl-4-hydroxyphenyl)propane, 2,2-bis(3,5-dimethyl-4-hydroxyphenyl)propane and 2,2-bis(3-methyl-4-hydroxyphenyl)butane or the like.

As the dicarboxylic acid compound, 4,4'-stilbenedicarboxylic acid chloride is preferably used. When a copolymer as shown in the general formula (II) is prepared, terephthaloyl chloride, isophthaloyl chloride, phthaloyl chloride and biphenyldicarboxylic acid chloride are used in combination.

Although there is no particular limitation on the phase transfer catalyst, it is possible to use quaternary ammonium salts such as methyltri-n-octylammonium chloride and benzyltriethylammonium chloride; and quaternary phosphonium salts such as tetraphenylphosphonium chloride. Although there is no particular limitation on the water-immiscible organic solvent, it is possible to use chloroform and dichloromethane.

[Method for Producing Birefringent Film]

The birefringent film of the present invention can be formed by any methods such as a solution flow casting method and a melt extrusion method. The ester-based polymer to be used in the present invention has a property in which a polymer ring is voluntarily oriented during the volatilization process of the solvent so that a refractive index $n_z$ in the thickness direction of the film becomes smaller than a maximum refractive index $n_x$ in the film plane. Therefore, in the production of the birefringent film of the present invention, the solution flow casting method is preferably used in view of exhibition of birefringence.

The solution flow casting method is a method in which the ester-based polymer is dissolved in a solvent to prepare a solution, followed by flow casting of this solution on the surface of a base material, coating and further drying. The solvent is not particularly limited as long as it dissolves the ester-based polymer and, for example, toluene, methyl isobutyl ketone, cyclopentanone and ethyl acetate are used. The concentration of the solution is usually from 1% by weight to 40% by weight. As flow casting and coating means, any coaters such as a spin coater, a die coater and a bar coater are used. As the drying means, any dryers such as an air-circulation drying oven and a heat drum are used. The drying temperature is usually from 40° C. to 200° C.

There is no particular limitation on a base material to be coated with the solution, and the base material may be either a single-layered or multi-layered laminate (including, for example, an anchor coating layer). Specific examples of the base material include a glass plate and a polymer film. When the base material includes an anchor coating layer, the anchor coating layer is not particularly limited, but is preferably a vinyl alcohol-based polymer or a urethane-based polymer in view of satisfactory adhesion with the ester-based polymer. The thickness of the anchor coating layer is preferably from 0.01 µm to 5 µm.

The glass plate as the base material is preferably a glass plate used for a liquid crystal cell, for example, non-alkali glass. When a polymer film is used as the base material, it is possible to impart flexibility to the base material. The material of the polymer film to be used as the base material is not particularly limited as long as it is a polymer having film-forming properties, and examples thereof include a styrene-based polymer, a (meth)acrylic acid-based polymer, an ester-based polymer, an olefin-based polymer, a norbornene-based polymer, an imide-based polymer, a cellulose-based polymer, a vinyl alcohol-based polymer and a carbonate-based polymer. The thickness of the base material is not particularly limited, except for use applications, but is generally within a range from 1 µm to 100 µm.

Since the ester-based polymer having at least a repeating unit represented by the general formula (I) or (II) is excellent in solubility, it is possible to use a solvent which is less likely to cause erosion of a polymer film, for example, toluene. Therefore, it is also possible to use a base material which could not be used in a conventional ester-based polymer because of severe erosion, for example, a film containing a (meth)acrylic acid-based polymer and an olefin-based polymer as main components. Thus, it becomes possible to reduce the cost of the birefringent film.

[Polarizing Element]

The polarizing element of the present invention includes the birefringent film of the present invention and a polarizer. Any polarizer can be used as long as it transmits one polarization component when light is separated into two perpendicular polarization components, and also absorbs, scatters or reflects the other polarization component. The polarizer is obtained, for example, by dyeing polyvinyl alcohol with a dichromatic pigment, followed by drawing. The thickness of the polarizer is not particularly limited, but is from 10 µm to 200 µm.

In one embodiment, the polarizing element of the present invention is obtained by laminating the birefringent film of the present invention, an adhesive layer, a polarizer, an adhesive layer and a transparent protective film in this order. With this constitution, since the birefringent film of the present invention also serves as a protective film of the polarizer, the polarizer can be thinned.

In another embodiment, the polarizing element of the present invention is obtained by laminating a laminate of the birefringent film of the present invention and a base material, an adhesive layer, a polarizer, an adhesive layer and a transparent protective film in this order. With this constitution, since a laminate of the birefringent film and the base material obtained in the production process of a birefringent film can be utilized as the protective film of the polarizer, the process of removing the birefringent film from the base material is omitted and thus productivity of the polarizer is improved.

The transparent protective film in the above constitution is not particularly limited as long as it is a film which is transparent and has a small birefringence index and, for example, it is possible to use a film containing, in addition to the (meth)acrylic acid-based polymer and the olefin-based polymer, a cellulose-based polymer and a norbornene-based polymer.

[Use Applications of Birefringent Film and Polarizing Element]

The birefringent film and polarizing element of the present invention are used for various optical elements by utilizing optical anisotropy. In particular, they are suitably used for various liquid crystal panels, for example, liquid crystal panels for PC monitors, notebook PCs, copying machines, cellular phones, clocks, digital cameras, personal digital assistants (PDA), handheld gaming devices, video cameras, liquid crystal televisions, microwave ovens, back monitors, car navigation systems, car audios, store monitors, monitors, care monitors and nurse monitors.

EXAMPLES

The present invention will be more clearly understood by referring to the Examples below. However, the Examples should not be construed to limit the invention in any way.

Example 1

In a reaction vessel equipped with a stirrer, as shown in Table 1, 3.27 g of 2,2-bis(3,5-dimethyl-4-hydroxyphenyl)-4-methylpentane and 0.20 g of methyltri-n-octylammonium chloride were dissolved in 35 ml of an aqueous 1 M potassium hydroxide solution. To this solution, a solution prepared by dissolving 3.05 g of 4,4'-stilbenedicarboxylic acid chloride in 35 ml of chloroform was added at one time while stirring, followed by stirring at room temperature (23° C.) for 90 minutes. Thereafter, the polymerization solution was allowed to stand to separate a chloroform solution containing a polymer, which was washed with aqueous acetic acid solution, washed with ion-exchange water and then poured into methanol to precipitate the polymer. The precipitated polymer was filtered and then dried under reduced pressure to obtain a white polymer of the following structural formula (III).

[Chemical Formula 3]

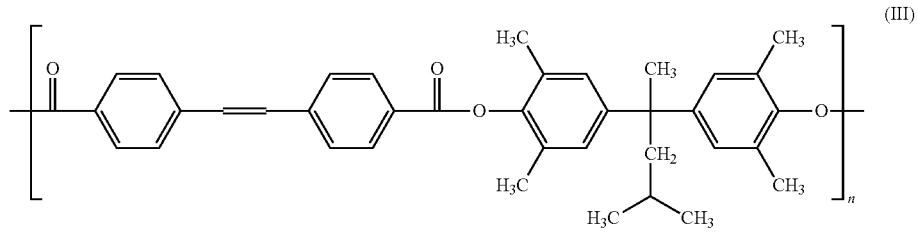

This polymer had a glass transition temperature Tg of 232° C. and a weight average molecular weight Mw of 144,000. Regarding the solubility in each solvent (cyclopentanone, toluene), 20% by weight or more of the polymer was dissolved in all solvents as shown in Table 2.

A birefringent film was produced by dissolving the resultant polymer in toluene, flow-casting the resultant solution on a glass substrate using a spin coating method, followed by coating, drying at 70° C. for 5 minutes and further drying at 110° C. After drying, the birefringent film had a thickness of 2.5 μm, a transmittance of 92%, and a birefringence index $\Delta n_{xz}$ [550] in the thickness direction at a wavelength 550 nm of 0.067 as shown in Table 2.

Example 2

In the same manner as in Example 1, except that 1.53 g of 4,4'-stilbenedicarboxylic acid chloride and 1.02 g of isophthaloyl chloride were used in place of 3.05 g of 4,4'-stilbenedicarboxylic acid chloride, a polymer of the following structural formula (IV) was obtained.

[Chemical Formula 5]

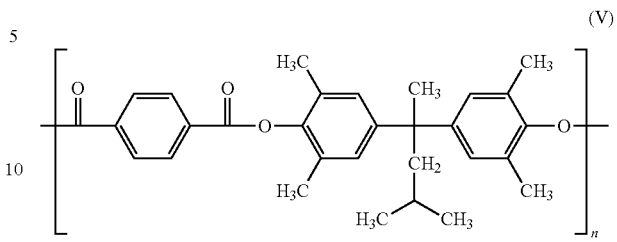

(V)

This polymer had a glass transition temperature Tg of 205° C. and a weight average molecular weight Mw of 39,000. Regarding the solubility in each solvent (cyclopentanone, toluene), 20% by weight or more of the polymer was dissolved in all solvents as shown in Table 2.

[Chemical Formula 4]

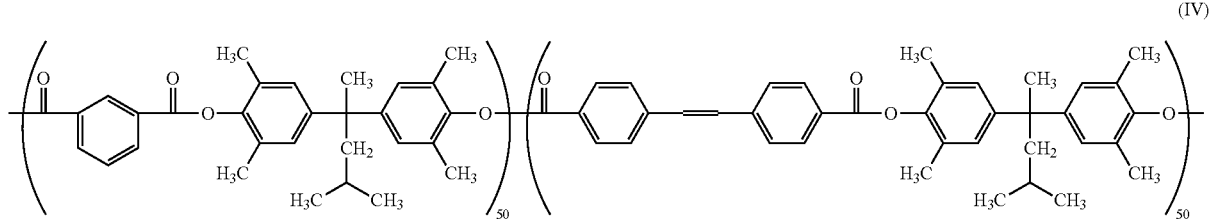

(IV)

This polymer had a glass transition temperature Tg of 228° C. and a weight average molecular weight Mw of 108,000. Regarding the solubility in each solvent (cyclopentanone, toluene), 20% by weight or more of the polymer was dissolved in all solvents as shown in Table 2.

In the same manner as in Example 1, a birefringent film was produced using the resultant polymer. After drying, the birefringent film had a thickness of 2.5 μm, a transmittance of 92%, and a birefringence index $\Delta n_{xz}$ [550] in the thickness direction at a wavelength 550 nm of 0.039 as shown in Table 2.

Comparative Example 1

In the same manner as in Example 1, except that 0.06 g of benzyltriethylammonium chloride was used in place of 0.20 g of methyltri-n-octylammonium chloride and 2.03 g of terephthaloyl chloride was used in place of 3.05 g of 4,4'-stilbenedicarboxylic acid chloride, a polymer of the following structural formula (V) was obtained.

In the same manner as in Example 1, a birefringent film was produced using the resultant polymer. After drying, the birefringent film had a thickness of 2.5 μm, a transmittance of 92%, and a birefringence index $\Delta n_{xz}$ [550] in the thickness direction at a wavelength 550 nm of 0.016 as shown in Table 2.

Comparative Example 2

In the same manner as in Example 1, except that 0.06 g of benzyltriethylammonium chloride was used in place of 0.20 g of methyltri-n-octylammonium chloride, and 1.02 g of terephthaloyl chloride and 1.02 g of isophthaloyl chloride were used in place of 3.05 g of 4,4'-stilbenedicarboxylic acid chloride, a polymer of the following structural formula (VI) was obtained.

[Chemical Formula 6]

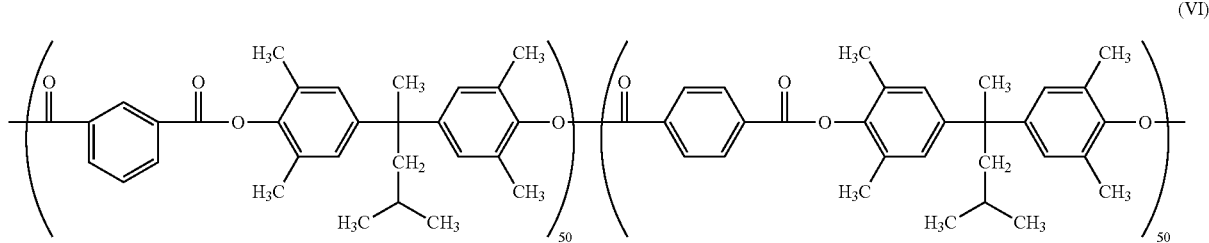

(VI)

This polymer had a glass transition temperature Tg of 205° C. and a weight average molecular weight Mw of 61,000. Regarding the solubility in each solvent (cyclopentanone, toluene), 20% by weight or more of the polymer was dissolved in all solvents as shown in Table 2.

In the same manner as in Example 1, a birefringent film was produced using the resultant polymer. After drying, the birefringent film had a thickness of 2.5 μm, a transmittance of 92%, and a birefringence index $\Delta n_{xz}$ [550] in the thickness direction at a wavelength 550 nm of 0.014 as shown in Table 2.

Comparative Example 3

In the same manner as in Example 1, except that 2.28 g of 2,2-bis(4-hydroxyphenyl)propane was used in place of 3.27 g of 2,2-bis(3,5-dimethyl-4-hydroxyphenyl)-4-methylpentane, 0.07 g of benzyltriethylammonium chloride was used in place of 0.20 g of methyltrin-n-octylammonium chloride, and 1.02 g of terephthaloyl chloride and 1.02 g of isophthaloyl chloride were used in place of 3.05 g of 4,4'-stilbenedicarboxylic acid chloride, a polymer of the following structural formula (VII) was obtained.

[Chemical Formula 7]

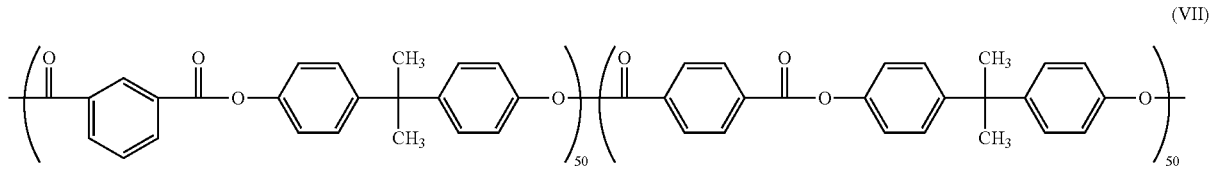

(VII)

This polymer had a glass transition temperature Tg of 200° C. and a weight average molecular weight Mw of 77,000. Regarding the solubility in each solvent (cyclopentanone, toluene), the polymer was insoluble in cyclopentanone and toluene as shown in Table 2.

In the same manner as in Example 1, a birefringent film was produced by dissolving the resultant polymer in chloroform. After drying, the birefringent film had a thickness of 2.5 a transmittance of 92%, and a birefringence index $\Delta n_{xz}$ [550] in the thickness direction at a wavelength 550 nm of 0.020 as shown in Table 2.

TABLE 1

| | Examples | | Comparative Examples | | |
|---|---|---|---|---|---|
| | 1 | 2 | 1 | 2 | 3 |
| 2,2-bis(3,5-dimethyl-4-hydroxyphenyl)-4-methylpentane | 3.27 g | 3.27 g | 3.27 g | 3.27 g | — |
| 2,2-bis(4-hydroxyphenyl)propane | — | — | — | — | 2.28 g |
| Methyltri-n-octylammonium chloride | 0.20 g | 0.20 g | — | — | — |
| Benzyltriethylammonium chloride | — | — | 0.06 g | 0.06 g | 0.07 g |
| Aqueous potassium hydroxide solution | 35 ml | 35 ml | 35 ml | 30 ml | 30 ml |
| 4,4'-stilbenedicarboxylic acid chloride | 3.05 g | 1.53 g | — | — | — |
| Terephthaloyl chloride | — | — | 2.03 g | 1.02 g | 1.02 g |
| Isophthaloyl chloride | — | 1.02 g | — | 1.02 g | 1.02 g |

TABLE 1-continued

|  | Examples | | Comparative Examples | | |
| --- | --- | --- | --- | --- | --- |
|  | 1 | 2 | 1 | 2 | 3 |
| Chloroform | 35 ml | 35 ml | 35 ml | 35 ml | 30 ml |
| Structural formula of polymer | III | IV | V | VI | VII |

TABLE 2

| | Structural formula of polymer | Birefringence index in thickness direction | Solubility | |
| --- | --- | --- | --- | --- |
| | | | Cyclopentanone | Toluene |
| Example 1 | III | 0.067 | o | o |
| Example 2 | IV | 0.039 | o | o |
| Comparative Example 1 | V | 0.016 | o | o |
| Comparative Example 2 | VI | 0.014 | o | o |
| Comparative Example 3 | VII | 0.020 | x | x |

Birefringence index in thickness direction: value at a wavelength of 550 nm ($\Delta n_{xz}$ [550])
Solubility:
"o" (soluble 20% by weight or more)
"x" (insoluble)

[Evaluation]

The ester-based polymer (structural formula III) of Example 1 showed satisfactory solubility in each solvent (cyclopentanone, toluene), and also the birefringent film obtained from this ester-based polymer showed a very high birefringence index ($\Delta n_{xz}$ [550]=0.067).

The ester-based polymer (structural formula IV) of Example 2 showed satisfactory solubility in each solvent (cyclopentanone, toluene), and also the birefringent film obtained from this ester-based polymer showed a high birefringence index ($\Delta n_{xz}$ [550]=0.039). The reason why the birefringence is considerably lower than that in Example 1 is considered that a copolymer was formed by decreasing the amount of 4,4'-stilbenedicarboxylic acid chloride and adding isophthaloyl chloride.

Although the ester-based polymer (structural formula V) of Comparative Example 1 shows satisfactory solubility in each solvent (cyclopentanone, toluene), there was a problem that the birefringent film obtained from this ester-based polymer has a low birefringence index ($\Delta n_{xz}$ [550]=0.016).

For example, in a case where a birefringent film having a phase difference value in the thickness direction (=birefringence index $\Delta n_{xz}$ [550] in the thickness direction x film thickness) of 200 nm is produced, the film thickness becomes 12.5 μm when the ester-based polymer of Comparative Example 1 is used. When the ester-based polymer of Example 1 is used, the film thickness is merely 3.0 μm and thus it is possible to perform thinning by 9.5 μm (76%).

Although the ester-based polymer (structural formula VI) of Comparative Example 2 shows satisfactory solubility in each solvent (cyclopentanone, toluene), there was a problem that the birefringent film obtained from this ester-based polymer has a birefringence index ($\Delta n_{xz}$ [550]=0.014) which is lower than that in Comparative Example 1.

Although the ester-based polymer (structural formula VII) of Comparative Example 3 has an advantage that the birefringence index ($\Delta n_{xz}$ [550]=0.020) of the birefringent film obtained from this ester-based polymer is slightly higher than those in Comparative Examples 1 and 2, there was a problem that it is not easy to use because the birefringent film is insoluble in each solvent (cyclopentanone, toluene).

[Measurement Method]
[Glass Transition Temperature]

Using a differential scanning calorimeter (manufactured by Seiko Instruments Inc., product name "DSC-6200"), a glass transition temperature was measured by the method in accordance with JIS K 7121 (1987: Method for Measurement of Transition Temperature of Plastic). Specifically, 3 mg of a powder sample was heated from room temperature to 220° C. at a temperature raising rate of 10° C./min under a nitrogen atmosphere (nitrogen gas flow rate: 50 ml/min) and was cooled to 30° C. at a temperature falling rate of 10° C./min, and then first measurement was carried out. Next, the sample was heated to 350° C. at a temperature raising rate of 10° C./min and second measurement was carried out. As the glass transition temperature, data of the second measurement was adopted. The calorimeter was subjected to temperature correction using a standard substance (indium).

[Weight Average Molecular Weight]

After preparing a 0.1% tetrahydrofuran solution of each sample and filtering the solution through a 0.45 μm membrane filter, a weight average molecular weight was measured by using a gel permeation chromatograph (manufactured by TOSOH CORPORATION, product name "HLC-8820 GPC") as a GPC body and using RI (built in the GPC body) as a detector. Specifically, the measurement was carried out at a column temperature of 40° C. and a pump flow rate of 0.35 ml/min and data processing was carried out using a calibration curve of a standard polystyrene having a known molecular weight, and then the molecular weight was determined from a molecular weight in terms of polystyrene. Super HZM-M (6.0 mm in diameter×15 cm), Super HZM-M (6.0 mm in diameter×15 cm.) and Super HZ 2000 (6.0 mm in diameter×15 cut) were connected in series and used as a column, while tetrahydrofuran was used as a mobile phase.

[Transmittance]

Using a spectrophotometer (manufactured by Hitachi, Ltd., product name "U-4100"), transmittance at a wavelength of 400 nm was measured.

[Birefringence Index in Thickness Direction]

Using "KOBRA-WPR" (product name, manufactured by Oji Scientific Instruments), a birefringence index in the thickness direction was measured at a wavelength of 550 nm. The birefringence index $\Delta n_{xz}$ [550] in the thickness direction was determined from a front phase difference value and a phase difference value ($R_{40}$) obtained in a state where a sample was inclined by 40 degrees by calculating using programs supplied with a device. The value determined by "Dektak" (product name, manufactured by Sloan Co.) was used as a film thickness.

[Solubility]

In a sample bottle containing each solvent, a polymer was added little by little and then the degree of dissolution was visually observed.

There have thus been shown and described a novel birefringent film, and a novel polarizing element, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A birefringent film comprising an ester-based polymer having at least a repeating unit represented by the following formula (I):

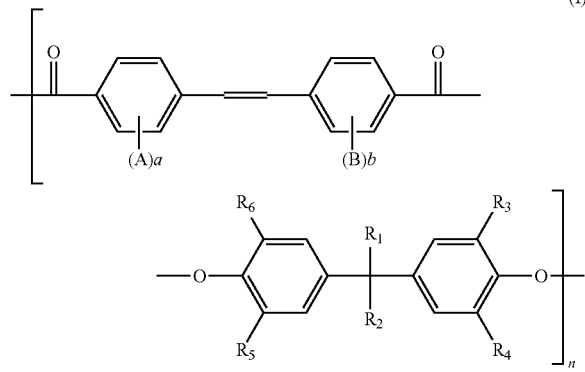

wherein A and B each independently represents a hydrogen atom, a halogen atom, an alkyl group having 1 to 6 carbon atoms, or a substituted or unsubstituted aryl group; a and b each independently represents any one of integers of 0 to 4; $R_1$ represents a hydrogen atom, a linear or branched alkyl group having 1 to 10 carbon atoms, or a substituted or unsubstituted aryl group; $R_2$ represents a linear or branched alkyl group having 2 to 10 carbon atoms; $R_3$ to $R_6$ each independently represents a hydrogen atom, a halogen atom, a linear or branched alkyl group having 1 to 6 carbon atoms, or a substituted or unsubstituted aryl group; and n represents an integer of 2 or more.

2. The birefringent film according to claim 1, wherein $R_1$ is a methyl group, and $R_2$ is a linear or branched alkyl group having 2 to 4 carbon atoms in the above formula (I).

3. The birefringent film according to claim 1, wherein $R_3$ to $R_6$ each independently represents a linear or branched alkyl group having 1 to 4 carbon atoms in the above formula (I).

4. The birefringent film according to claim 3, wherein the ester-based polymer having at least a repeating unit represented by the formula (I) or (II) has a glass transition temperature of 100° C. or higher and 300° C. or lower.

5. The birefringent film according to claim 1, wherein the ester-based polymer having at least a repeating unit represented by the formula (I) or (II) has a glass transition temperature of 100° C. or higher and 300° C. or lower.

6. A birefringent film comprising a copolymer ester-based polymer having at least a repeating unit represented by the following formula (II):

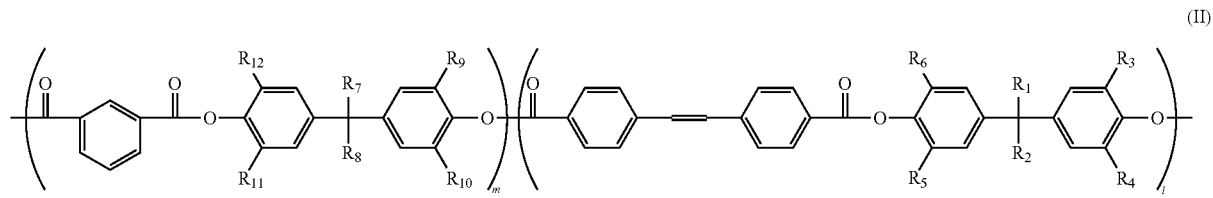

wherein $R_1$ represents a hydrogen atom, a linear or branched alkyl group having 1 to 10 carbon atoms, or a substituted or unsubstituted aryl group; $R_2$ represents a linear or branched alkyl group having 2 to 10 carbon atoms; $R_3$ to $R_6$ each independently represents a hydrogen atom, a halogen atom, a linear or branched alkyl group having 1 to 6 carbon atoms, or a substituted or unsubstituted aryl group; $R_7$ and $R_8$ are respectively the same as those for $R_1$ and $R_2$; $R_9$ to $R_{12}$ are respectively the same as those for $R_3$ to $R_6$; and l and m are integers of 2 or more.

7. The birefringent film according to claim 6, wherein the value of $l/(l+m)$ is from 0.3 to 0.8 in the copolymer ester-based polymer represented by the formula (II).

8. The birefringent film according to claim 6, wherein the ester-based polymer having at least a repeating unit represented by the formula (I) or (II) has a glass transition temperature of 100° C. or higher and 300° C. or lower.

9. A polarizing element comprising the birefringent film according to any one of claims 1 to 8 and a polarizer.

10. A polarizing element comprising the birefringent film according to any one of claims 1 to 8, a first adhesive layer, a polarizer, a second adhesive layer and a transparent protective film, laminated in order of the birefringent film, the first adhesive layer, the polarizer, the second adhesive layer and the transparent protective film.

11. A polarizing element comprising a laminate of the birefringent film according to any one of claims 1 to 8 and a base material, a first adhesive layer, a polarizer, a second adhesive layer and a transparent protective film, laminated in order of the laminate of the birefringent film, the base material, the first adhesive layer, the polarizer, the second adhesive layer and the transparent protective film.

* * * * *